No. 882,363. PATENTED MAR. 17, 1908.
J. T. WRIGHT.
DENTAL INSTRUMENT.
APPLICATION FILED SEPT. 18, 1907.
2 SHEETS—SHEET 1.
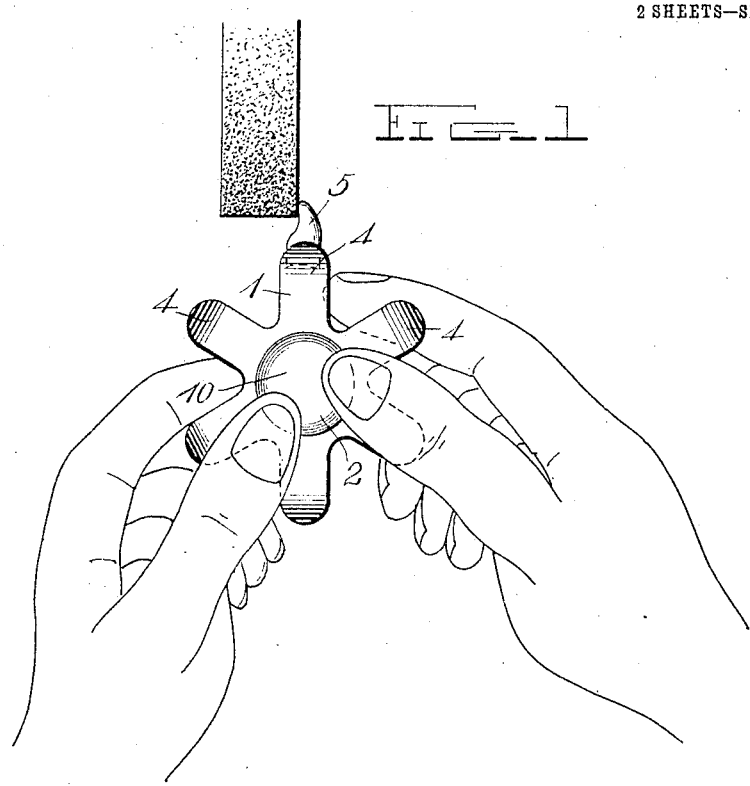
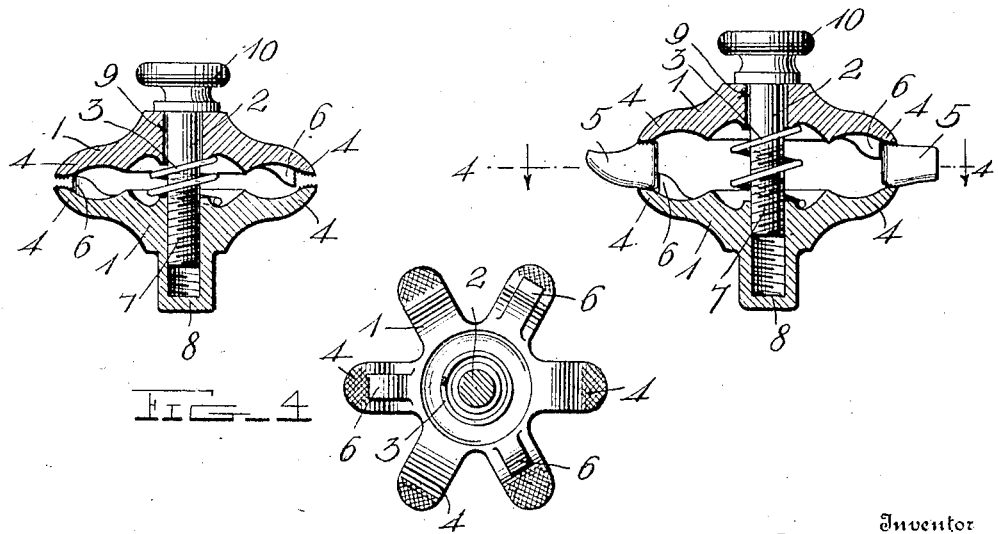
Witnesses
C. Ellenter
May M. Plyer.
Inventor
Julian T. Wright
By Jas. L. Skidmore
his Attorney.

No. 882,363. PATENTED MAR. 17, 1908.
J. T. WRIGHT.
DENTAL INSTRUMENT.
APPLICATION FILED SEPT. 18, 1907.
2 SHEETS—SHEET 2.
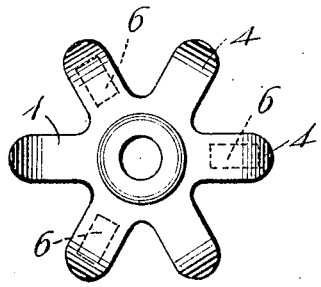
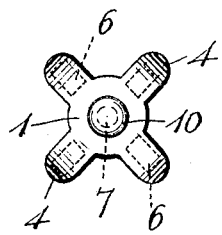
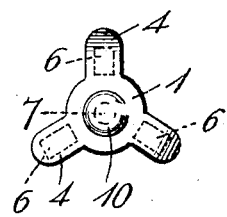
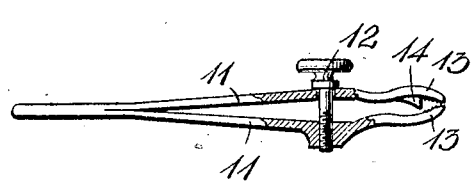
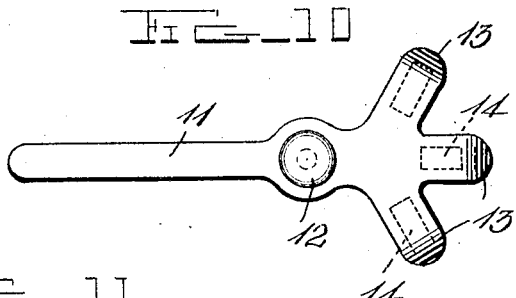
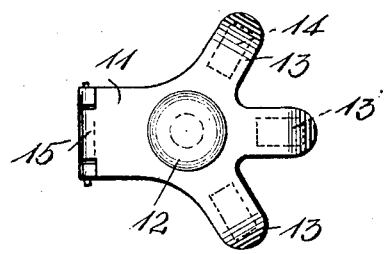
Witnesses
Inventor
Julian T. Wright
By Jas. L. Skidmore
his Attorney.

UNITED STATES PATENT OFFICE.

JULIAN T. WRIGHT, OF RICHMOND, VIRGINIA, ASSIGNOR OF ONE-HALF TO EDDIE SNOWDEN DAVIS, OF RICHMOND, VIRGINIA.

DENTAL INSTRUMENT.

No. 882,363. Specification of Letters Patent. Patented March 17, 1908.

Application filed September 18, 1907. Serial No. 393,444.

*To all whom it may concern:*

Be it known that I, JULIAN T. WRIGHT, a citizen of the United States, residing at Richmond, in the county of Henrico and State of Virginia, have invented certain new and useful Improvements in Dental Instruments, of which the following is a specification.

This invention relates to dental instruments and has for its object to provide a dental instrument by means of which a tooth may be rigidly held while being ground, all as hereinafter set forth, and claimed.

The device is of such a construction that it may be held adjacent to a grinding machine and a tooth rigidly held in various positions or any position desired while being ground be presented to the grinding wheel. The instrument is of such shape and construction as to adapt it to hold any tooth of various dimensions, shape or form, the main object in view being to provide a device which will be thoroughly effective as to the rigid holding of a tooth in various positions while being ground without injury whatever to the hands of the operator or to the tooth or pins of a tooth.

Referring to the accompanying drawings:—Figure 1 is a plan view showing the manner of holding the instrument against a grinding wheel. Fig. 2 is a side view in vertical section of the dental instrument. Fig. 3 is a side view in vertical section showing the instrument holding a tooth and in position for operation. Fig. 4 is a side view showing the construction of the device. Fig. 5 is a plan view of one of the holding members. Figs. 6, 7 and 8 are detail views of modifications of the holding member. Fig. 9 is a side view of a modified form of the dental instrument. Fig. 10 is a modification of another form. Fig. 11 is another modification.

The dental clamp constructed according to this invention consists of the upper and lower members or plates 1, 1, each of which may have one or more teeth supporting receptacles as hereinafter set forth. These two members or plates are held together and the upper member actuated by a screw 2 and in conjunction with a spiral spring 3 encircling the shaft of the screw and compressed between the two plates 1, 1. The two plates may be of the same or different shape as desired and as may be best adapted for holding single teeth of various dimensions, shapes or form. As shown in Figs. 1 and 8, the plates 1, 1 are of a circular disk form and the peripheries of the plates 1, 1, are formed with one or more curved arms having portions 4 located opposite each other, forming seats or recesses adapted to hold one or more teeth 5, as shown. In order to hold each tooth in proper position between the clamping plates 1, 1 stops 6 of suitable size, and varying in size and distance from the outer edges of the plates, are provided to aid in holding the tooth or teeth from being moved too far into the dental clamp when held against the wheel. The stop 6 projects on the inner surface of the plate 1 at a suitable distance in the rear of the recess or seat formed by the curved portions 4 for the purpose specified. The lower end of the screw 2 has a screw threaded portion 7 which projects into the socket 8 in the lower portion of the lower plate 1, the upper end of the screw 2 being smooth and extending through a hole 9 in the upper plate 1 and terminating in a thumb nut 10. By means of this construction it will readily be seen that the upper plate 1 can be adjusted towards the lower plate 1 by screwing up screw 2, thereby at the same time adjusting the tension of the spring 3. In this way, when a tooth is placed in one of the openings between the plates 1, 1, the teeth may be rigidly held in place by the instrument of the screw 2 and at the same time producing a cushioning effect on the tooth held between the plates 1, 1. A slight turn of the thumb nut 10 aided by the expansion of the spring 3 will cause the upper member to be raised by the expansion of the spring 3 and permit the teeth to be readily released. In the modifications shown in Figs. 9, 10 and 11 in lieu of the coil spring 2, the dental instrument is provided with elastic arms 11 projecting from the screw 12 rearwardly to form a handle and the plates extending forward from the screw 12 to form the holding members 13. The adjustment of this instrument is the same in principle as the others. In Fig. 11 is shown another modified form of the instrument in which the holding members are hinged together at 15. Figs. 6, 7 and 8 show modifications in the shape of the clamping plate.

By means of a dental instrument constructed as herein described, the instrument may be held in the hands as shown in Fig. 1 and a tooth clamped in said instrument may be held against an emery or other grinding wheel 16 as shown in Figs. 1 and 3. After the particular tooth is suitably ground, another tooth held by the instrument may be laid against the emery wheel.

As only one tooth is ground at a time, in practice but one tooth is held in the instrument unless when grinding block teeth, in which case the block teeth are placed in one receptacle. The object of providing the instrument with a number of receptacles of various sizes and shapes is to hold any tooth in any desirable position while being ground. The receptacles are preferably milled or roughened which in addition to the pressure of the tooth against the grinding stone aids in holding the tooth rigidly in conjunction with the pressure of the clamping members.

Having described the invention, I claim

1. A dental instrument for clamping a tooth while being ground, consisting of an upper and a lower holding jaw, one of said jaws being provided with an integral projecting stop, and means for adjustably securing the jaws and for holding said tooth in position between the jaws with a yielding pressure.

2. A dental instrument for clamping teeth while being ground, consisting of a pair of members having a plurality of projections on their meeting edges, said projections constituting jaws for the reception of one or more teeth, and means for adjusting elastically one of said members towards the other to hold said teeth in position.

3. A dental instrument for holding teeth while being ground, consisting of a pair of members provided with a plurality of radially arranged projections on their meeting edges constituting jaws for holding teeth in position, and means for adjustably securing said members to rigidly clamp said teeth between the jaws.

4. A dental instrument for holding teeth while being ground, consisting of two holding members connected together by a screw, the lower member being connected with the screw by a screw-thread and the upper member being mounted to slide on said screw, both of said members being formed with a series of projections constituting jaws adapted to receive and secure one or more teeth between their meeting edges.

5. A dental instrument for holding teeth while being ground, comprising an upper and a lower member, the upper member having a series of concaves in its lower face, and the lower member provided with a series of concaves in its upper face or surface, and means for adjustably securing the members together whereby one or a series of teeth may be rigidly clamped between them.

JULIAN T. WRIGHT.

In presence of—
Wm. B. Poythness,
Hugh W. Jones.